Inventor
Robert J. Rink
by Parker & Carter
Attorneys

Dec. 27, 1955  R. J. RINK  2,728,614
VIBRATORY POWER UNIT AND LUBRICATING MEANS THEREFOR
Filed April 4, 1955  3 Sheets-Sheet 2
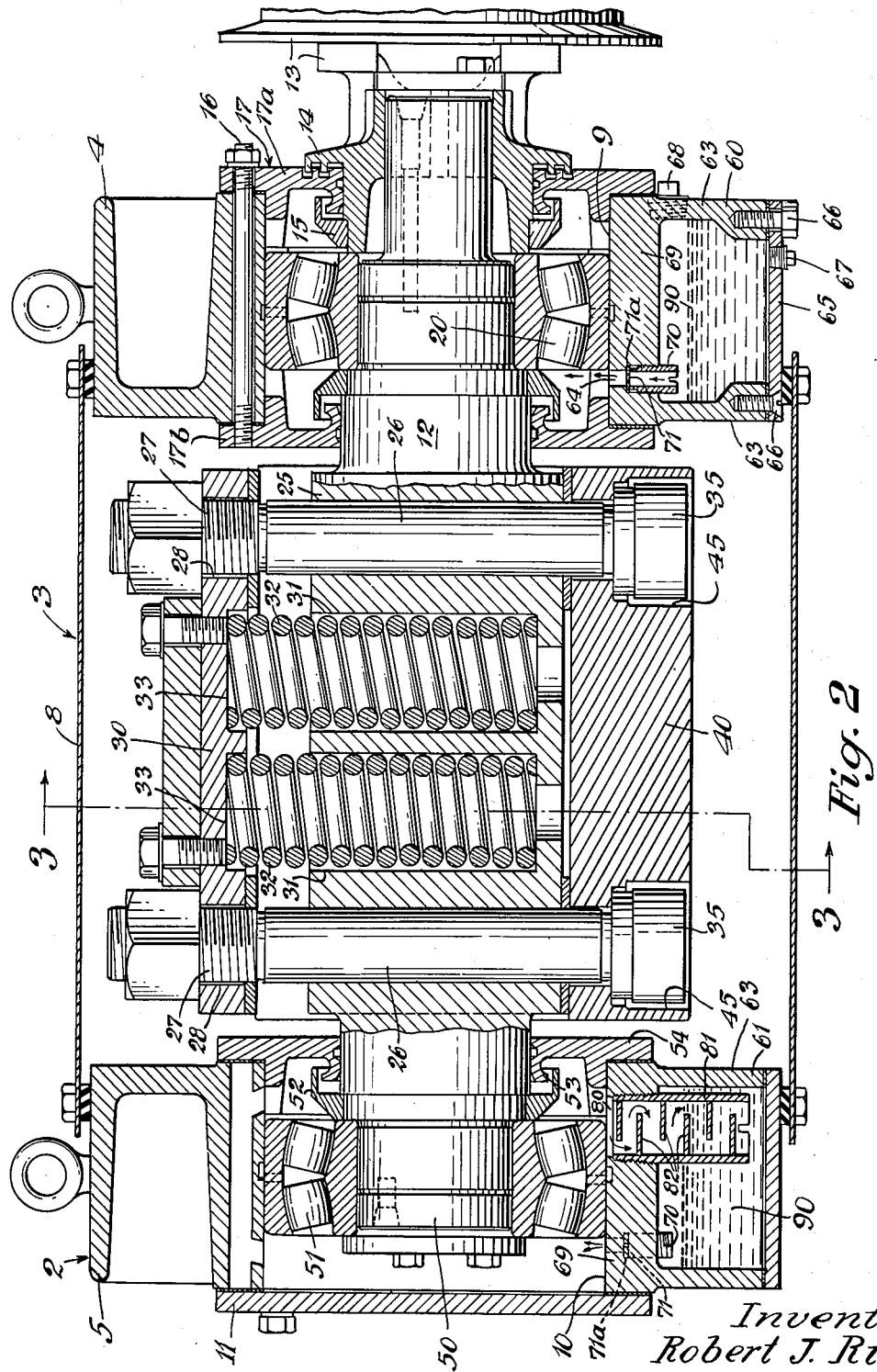
Fig. 2
Inventor
Robert J. Rink
by Parker & Carter
Attorneys Dec. 27, 1955  R. J. RINK  2,728,614
VIBRATORY POWER UNIT AND LUBRICATING MEANS THEREFOR
Filed April 4, 1955  3 Sheets-Sheet 3

Inventor
Robert J. Rink by Parker & Carter
Attorneys

United States Patent Office 2,728,614
Patented Dec. 27, 1955

2,728,614

VIBRATORY POWER UNIT AND LUBRICATING MEANS THEREFOR

Robert J. Rink, West Allis, Wis., assignor to Nordberg Manufacturing Company, Milwaukee, Wis., a corporation of Wisconsin Application April 4, 1955, Serial No. 498,877

6 Claims. (Cl. 308—187)

This invention relates to vibratory power units and has particular relation to a lubricating system therefor.

One purpose of the invention is to provide a lubricating system for a vibratory power unit which shall be economical to produce and simple in operation.

Another purpose is to provide a vibratory power unit and lubricating system wherein the vibratory motion created by the vibratory power unit is effective to produce a circulation of lubricant to the parts requiring lubrication.

Another purpose is to provide a lubricating system for a vibratory power unit which may be carried by said unit.

Another purpose is to provide a lubrication system for a vibratory power unit wherein a controlled amount of lubricant may be supplied to the parts requiring lubrication.

Another purpose is to provide a lubrication system for a vibratory power unit having elements formed to control the circulation of lubricants.

Another purpose is to provide a lubrication system for a vibratory power unit wherein a lubricant is caused to circulate through the parts requiring lubrication in response to the vibratory motion created by said power unit.

Other purposes will appear from time to time in the course of the specification and claims.

The invention is illustrated more or less diagrammatically in the following drawings wherein;

Figure 2 is a side view in partial cross-section of the power unit and lubrication system of the invention.

Like parts are indicated by like symbols throughout the specification and drawings.

Figure 1:
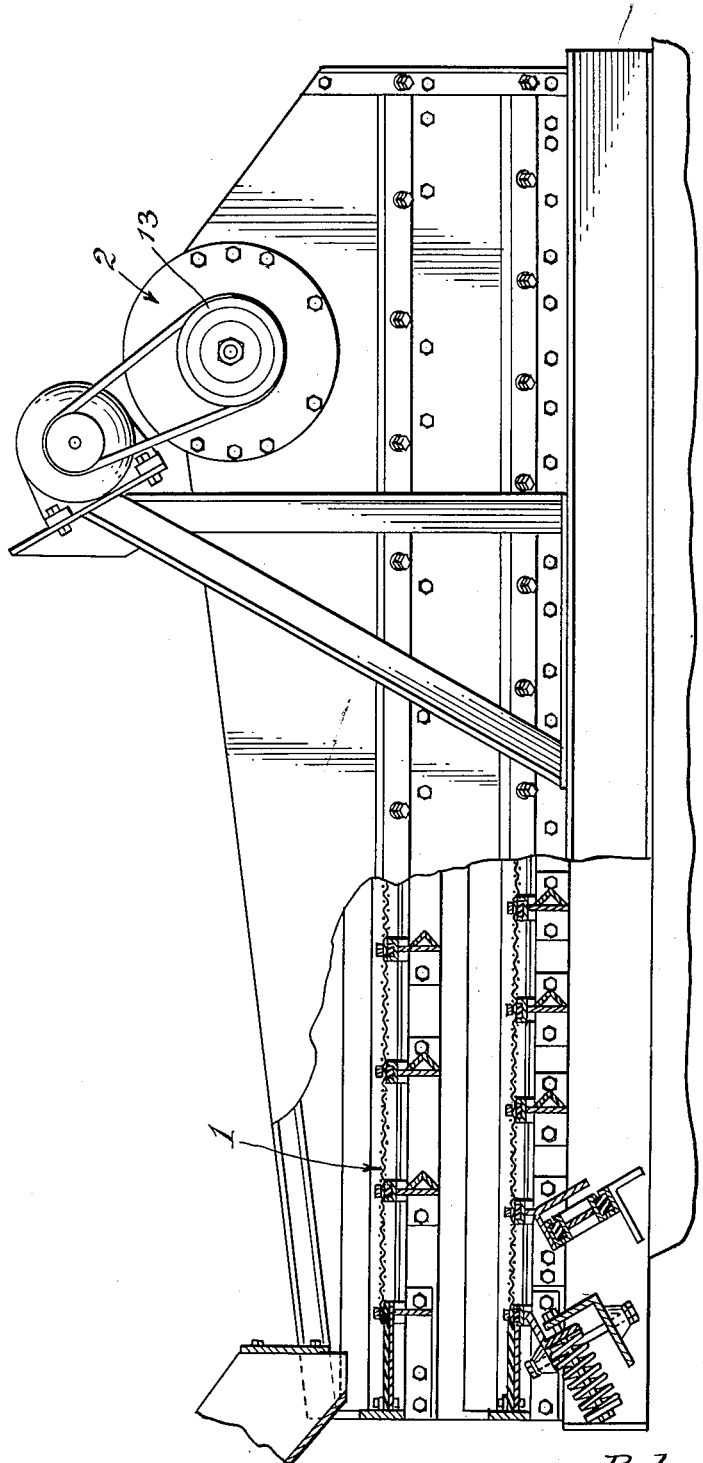
Figure 1 is a side elevation of a screen mechanism with which a vibratory power unit may be employed.

Referring now to the drawings, and particularly to Figure 1, the numeral 1 generally indicates a substantially horizontal screen mechanism with which the vibratory power unit indicated generally at 2 in Figure 1, may be employed. Since the screen mechanism itself forms no part of the present invention, it will not be further described. For a more detailed understanding of the screen mechanism 1, reference may be had, for example, to United States Patents Nos. 2,321,166 and 2,367,070. While the vibratory power unit 2 is shown as being employed to create a vibration of the screen 1, it will be understood that the vibratory power unit 2 may be employed with a variety of mechanisms without departing from the nature and scope of my invention.

Referring now to Figure 2, the numeral 3 generally indicates a housing for the power unit 2. The housing 3 may include end members 4, 5. Securing members 6, 7 may be utilized to secure the power unit to a mechanism, such as the screen 1, to be vibrated. 8 generally indicates a housing wall or covering connected at its opposite ends to the spaced end members 4, 5. The end members 4, 5 are centrally apertured as indicated generally at 9, 10 respectively. An end cover plate 11 may be connected to the outer surface of the end member 5 to mask the aperture 10 therein.

Rotatably mounted within the housing 3 and extending into the apertures 9, 10 is a shaft 12. The shaft 12 may have extending outwardly from the aperture 9 of the end member 4, a pulley 13. Any suitable driving means may be employed to rotate the pulley 13 and thereby to rotate the shaft 12. The pulley 13 may carry a sealing ring 14 which may in turn carry the internal lubricant baffle member 15. Secured to the end member 4 as by the securing means 16 is a flinger ring assembly 17. As best seen in Figure 2, the flinger ring assembly 17 comprises an outer flinger ring 17a and an inner flinger ring 17b. The sealing ring 14 rotates in contact with the cylindrical inner wall of the rings 17a and the shaft 12 similarly rotates in contact with the cylindrical inner wall of the flinger ring 17b. A roller bearing member 20 may be positioned generally centrally within the aperture 9 in the end member 4.

Figure 3:
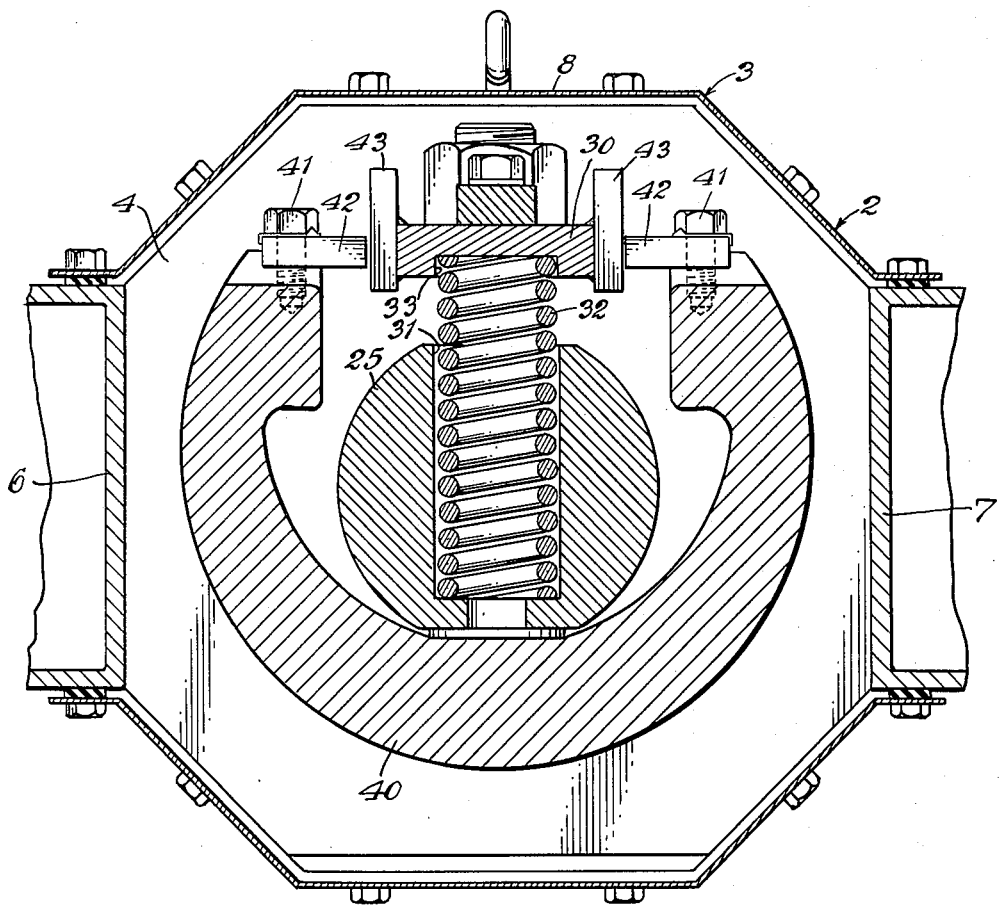
Figure 3 is a view taken on the lines of 3—3 of Figure 2.

The shaft 12 may have a central enlarged portion 25. The enlarged shaft portion 25 may be transversely apertured adjacent its opposite ends and a weight supporting rod 26 may be positioned in each of said transverse apertures or bores. The rods 26 may each have their upper ends threaded as indicated generally at 27 and the threaded end portions 27 may extend through spaced apertures 28 in a spring retaining plate member 30. A pair of transversely positioned wells 31 may be formed in the shaft enlargement 25 between the rods 26 and a pair of springs 32 may be positioned in the wells 31. The springs 32 have their upper ends positioned within recesses 33 formed in the lower surface of the plate 30. The shafts 26 have end enlargements 35 spaced outwardly from the shaft enlargement 25. A generally crescent shaped weight member 40 may be positioned beneath and to either side of the shaft enlargement 25 as the parts are seen in Figure 3. The upper spaced end portions of the weight 40 may each have connected thereto as by the securing means 41, a guide member 42. The plate 30 may have along its longitudinal edges, upstanding wall members 43 against which the inner edges of the guide plates 42 may bear to position the weight 40 when the vibratory unit is operated. The weight 40 has a pair of offset apertures 45 through which extends the lower ends of the rods 26 and in which are positioned the end enlargements 35 of the rods 26 to support the weight 40 flexibly or movably on the shaft 12.

The shaft 12 has an end portion 50 positioned for rotation within the central opening 10 in the end member 5. The shaft end portion 50 is mounted in a roller bearing member 51 positioned within the opening 10 in the end member 5. The shaft end portion 50 also carries an oil baffle member 52 which rotates about an inner portion 53 of a flinger 54 associated with the end member 5.

A reservoir 60 is formed integrally with the end member 4 or it may be secured thereto. A similar lubricant reservoir member 61 may be similarly associated with the end member 5. The reservoir 60, 61 may be positioned adjacent the lower portion of the end members 4, 5, and in general vertical alignment with the openings 9, 10 therein, respectively.

Since the lubricant supply mechanism for the end member 4 may be substantially identical with the lubricant supply mechanism for the end member 5, a description of one such mechanism may suffice. The lubricant-supply mechanism for the end member 4 and bearing 20, for example, may comprise a generally U-shaped housing 63 having a lubricant passage 64 formed in the upper wall thereof to place the area within the member 63 in communication with the opening 9 in the end member 4, in which the bearing 20 is positioned, at a point on one side of the bearing 20. As above mentioned the bearing 20 may be positioned generally centrally in the aperture 9 thus insuring the availability of an oil lubricant receiving space to either side of the bearing 20. A closure plate 65 may be secured to the spaced side walls of the member 63 by any suitable securing means such as the bolts 66. A drain plug 67 may be threadably engaged with the bottom plate 65. A lubricant or oil filler plug 68 may be positioned in a side wall of the portion 63 adjacent the top wall 69 thereof in which the passage 64 is formed.

A lubricant nozzle member 70 may be positioned within the passage 64 in the top wall 69 of the lubricant supply member 63. The nozzle 70 has a lubricant discharge orifice 71 the diameter of which is substantially less than the internal diameter of the nozzle member 70.

As shown in the left-hand portion of Figure 2, the lubricating mechanism of the present invention may have a lubricant receiving passage 80 formed in the upper wall thereof in alignment with that portion of the opening in the end member or the end member 5 on the opposite side of the bearing 20 or 51 from that with which the lubricant supply nozzle 70 is associated. Threadably engaged in the passage 80 is an oil baffle member 81 which may be a hollow tube having the alternating baffle plates 82 extending inwardly from the inner wall thereof to form a tortuous path for lubricant passing through the member 81.

Whereas I have described and claimed a practical and operative device, nevertheless many changes may be made in the size, shape, number and disposition of parts without departing from the spirit of my invention. I therefore wish my description and drawings to be taken as in a broad sense illustrative or diagrammatic, rather than as limiting me to my precise showing.

The use and operation of the invention is as follows:

When the shaft 12 is rotated the eccentric weight 40 is caused to move against the action of the springs 32 outwardly away from the shaft and alternately to be returned in a direction towards the shaft by the action of the springs 32. The vibration created by rotation of the shaft 12 is imparted to the end members 4, 5, and through the connecting means 6, 7, to the mechanism, such as the screen 1, to be vibrated. Since the oil reservoirs 60, 61 are fixed in relation to the end members 4, 5 this vibration is similarly imparted to the members 60, 61. The supply of oil 90 in each of the members 60, 61 is thus caused to move relatively violently upward, as the parts are shown in the drawings, toward the upper wall 69 of the generally U-shaped portion 63. That portion of the oil supply 90 therefore which is beneath the tubular nozzle members 70 is forced to flow therethrough and against the end plate 71a of the nozzle 70. Some of the oil is thus forced through the nozzle orifice 71 and sprayed into the openings 9, 10 in the end members 4, 5 at one side of the roller bearings 20, 51 respectively. As indicated by the arrows in Figure 2, the oil thus sprayed from the nozzle orifice 71 into the space adjacent one side of the roller bearing 20 or 51 is picked up by the roller bearing and carried, by the rotation of the shaft 12, to all portions of the roller bearings and to the bearing surfaces between the flinger rings 17a, 17b, and 54 and the shaft 12. The oil or lubricant leaving the roller bearings 20, 51 at the side opposite from that to which the nozzle orifice 71 is supplying the oil is free to flow downwardly to the baffled oil-receiving member 81 to return to the reservoirs 60, 61. The baffles 82 are effective also to prevent the upward movement of the oil 90 to the member 81 in response to the vibration created by the vibratory power unit while at the same time being effective to permit the return of lubricant from the bearings 20, 51 to the reservoirs 60, 61.

I claim:

1. Lubrication means for use with a vibratory power unit wherein an eccentrically weighted shaft is rotated within a housing and a bearing between said shaft and said housing, said lubrication means comprising an oil reservoir connected adjacent the lower portion of said housing, oil passage means between said reservoir and the inside of said housing and an orifice in said passage whereby the vibration imparted to said housing in response to rotation of said shaft may cause oil to be forced through said orifice into said housing.

2. In a vibratory power unit comprising a housing, a bearing in said housing, a shaft rotatable in said bearing and means associated with said shaft to impart vibration to said housing, the improvement comprising lubrication means for said bearing, said lubrication means comprising an oil reservoir associated with a portion of said housing for vibration therewith, a passage placing said reservoir in communication with an inner area of said housing adjacent one side of said bearing whereby oil is forced through said passage in response to vibration of said housing and said reservoir to lubricate said bearing.

3. The structure of claim 2, characterized by and including a second passage means placing said reservoir in communication with an inner area of said housing adjacent the opposite side of said bearing to convey oil from said bearing back to said reservoir.

4. The structure of claim 3, characterized by and including baffle means in said second passage forming a tortuous path therein.

5. Means for lubricating a vibratory power unit wherein a shaft is rotated within a housing to create vibration in said housing, said lubricating means including a lubricant reservoir associated with said housing for vibration therewith, an oil passage placing said reservoir in communication with the area about the bearings between said shaft and said housing, a restriction in said passage, said passage being positioned to receive oil directed therethrough in response to the vibration of said reservoir and to convey said oil to said bearings.

6. The structure of claim 5 characterized by and including an oil-receiving passage in said reservoir positioned to receive oil from said bearing surface after said oil has passed along said bearing surfaces and to return said oil to said reservoir.

References Cited in the file of this patent

UNITED STATES PATENTS

| | | |
|---|---|---|
| 1,480,688 | Magill et al. | Jan. 15, 1924 |
| 2,311,279 | Parks | Feb. 16, 1943 |